UNITED STATES PATENT OFFICE 2,372,841

PROCESS FOR THE MANUFACTURE OF POLYNUCLEAR CARBONYL COMPOUNDS AND THEIR ENOL ESTERS

Karl Miescher, Riehen, and Jules Heer, Basel, Switzerland, assignors, by mesne assignments, to Ciba Pharmaceutical Products, Incorporated, Summit, N. J., a corporation of New Jersey No Drawing. Application July 5, 1940, Serial No. 344,164. In Switzerland July 28, 1939

6 Claims. (Cl. 260—397.4)

It is known that carbonyl compounds may be obtained by distillation of glycols of the steroid series with bisulfate or by zinc dust distillation of their monoacetates. By these methods, the yields are relatively small. (Compare, for example, Serini, Logemann, Hildebrand, "Berichte der Deutschen Chemischen Gesellschaft," vol. 72, page 394, 1939.) These processes are particularly unsuitable for the commercial preparation on the large scale.

The surprising observation has now been made that polynuclear carbonyl compounds and their enol esters can be obtained in good yield if polynuclear glycols or their esters are heated with metals in a finely divided state in the presence of diluents, and, finally, if desired, treated with hydrolyzing agents.

The saturated or unsaturated glycols or their mono- or di-esters to be used as parent substances may be derived from any desired polynuclear ring system, for example, that of the cyclopentanopolyhydrophenanthrene series or that of the polyhydrochrysene series, and they may be of any desired steric configuration and substituted as desired. As examples, mention may be made of allo-pregnane-3:17:20:21-tetrols, allo-pregnane - 3:11:17:20-21 - pentols, allo-pregnane-3:17:20 - triols, $\Delta^4$-pregnene-3-one-11:17:20:21-tetrols, $\Delta^5$-pregnene-3:17:20-triols, $\Delta^5$-pregnene-3:17:20:21-tetrols, $\Delta^4$-pregnene-3-one-17:20:21-triols, $\Delta^4$-pregnene-3-one-17:20-diols, $\Delta^4$-17-hydroxymethyl-androstene-3-one-17-ols, $\Delta^4$-21-dialkoxy-pregnene-3-one-17:20-diols, 3:9:11- or 3:11:12-trihydroxy-cholanic acid, oestriol, cafesterol, their stereoisomers and substitution products or corresponding mono- or poly-esters with organic or inorganic acids. The parent substances may be prepared by known methods, for example, by addition of hydroxyl groups to corresponding unsaturated compounds.

For the reaction, the metals of the first and second groups of the periodic system come particularly in question, such as, for example, zinc, cadmium, copper and the like. As diluents, mention may be made of hydrocarbons, such as toluene, xylene, decalene or methyl-cyclohexane, as well as pyridine, alcohols such as butyl and amyl alcohols, or even mixtures of solvents.

Example 1

1 part of a mixture of $\Delta^4$-pregnene-3-one-17$\alpha$:20:21-triol-20:21-diacetates, isomeric in the 20-position, such as is obtained when 17-vinyl-testosterone is hydroxylated with osmium tetroxide and the resulting triol is acetylated, is heated with 20 parts of zinc dust in 200 parts of toluene for several hours at the boil. After cooling, the solution is filtered, and the colorless filtrate is evaporated as far as possible in a vacuum. It is then allowed to cool, whereupon desoxy-corticosterone acetate crystallizes out in almost quantitative yield. It may be recrystallized from acetone, when it melts at 157–159° C. $[\alpha]_D^{19} = +177°$ (in alcoholic solution).

If the parent material given above be replaced by $\Delta^4$-pregnene-3-one - 17$\beta$+20:21-triol-20:21-diacetate, of melting point 194–196° C., which may be prepared by hydroxylation of $\Delta^{4:17}$-pregnadiene-3-one-21-ol and subsequent actylation, 17-iso-desoxy-corticosterone acetate is obtained in dimorphous forms of melting points 174° C. or 138° C. $[\alpha]_D^{17} = -26°$ (in acetone solution). It may be saponified with aqueous-alcoholic bicarbonate solution to yield 17-iso-desoxy-corticorsterone, of melting point 179–181° C.

Example 2

1 part of $\Delta^4$-pregnene-3-one-17$\alpha$:20$\alpha$:21-triol-20:21-diacetate, of melting point 180–181, obtained by fractional crystallization of the mixture of isomers used as parent material in Example 1, is boiled for 16 hours in 50 parts of toluene with 20 parts of zinc dust. The zinc dust is removed by filtering with suction and is washed with acetic ester, the filtrate is washed by shaking with water, then dried and evaporated in a vacuum. The residue, on recrystallization, yields desoxy-corticosterone acetate in almost quantitative quantity, having a melting point of 158–160° C.

$\Delta^4$-pregnene - 3 - one-17$\alpha$:20$\beta$:21-triol-20:21-diacetate, of melting point 162-163° C., which is isomeric with the above parent material, and which may be prepared by fractional crystallization of the mixture used as parent material in Example 1, yields the same desoxy-corticosterone acetate by analogous treatment.

In place of the acetates, other esters, derived from either organic or inorganic acids, for example, the propionic, butyric, or benzoic esters or esters derived from hydrogen halides, as well as the free glycols themselves, may be used as parent materials.

If, instead of 20:21-diesters, 17:20:21-triesters or 20:21-diester-3-enolesters, obtained by energetic esterification of the triols, are used as parent materials, 20- or 3-enolesters are obtained, which may be finally saponified by hydrolyzing agents to give the carbonyl compounds which form their bases.

Example 3

1 part of a mixture of $\Delta^5$-pregnene-3:17β:20-triol-3:20-diacetates, isomeric in the 20-position, prepared by hydroxylation of $\Delta^{5:17}$-3-acetoxy-pregnadiene with osmium tetroxide and subsequent acetylation, is dissolved in 30 parts of pyridine, 10 parts of zinc dust are added, and the reaction mixture is boiled for 15 hours under reflux. It is now filtered, the residue washed with acetone and the filtrate is evaporated in a vacuum. The residue obtained is recrystallized from dilute acetone and yields $\Delta^5$-17-iso-pregnene-3-ol-20-one acetate, melting at 172° C. It may be saponified to the free $\Delta^5$-17-iso-pregnene-3-ol-20-one acetate, with the same melting point, by known methods by means of aqueous-alcoholic bicarbonate solution.

In the same manner, the 17-iso-allo-pregnane-3:11:21-triol-20-one-3:21-diacetate, with the double melting point of 133° C. or 147–148° C., may be obtained from the allo-pregnane-3:11:17:20:21-pentol-3:20:21-triacetate obtainable by acetylation of the pentol occurring in the suprarenal cortex. On the other hand, if the allo-pregnane-3:17:20:21-tetrol-11-one-3:20:21-triacetate, obtainable by chromic acid oxidation of the parent substance named above, be used as the starting material, the 17-iso-3:21-diacetoxy-allo-pregnane-11:20-dione, of melting point 131–132° C., is obtained analogously.

Example 4

25 parts of zinc dust and 70 parts of toluene are added to 1 part of cafesterol, and this mixture is boiled under reflux for 14 hours. The solution is removed by filtering with suction, the mixture of zinc and zinc acetate is washed and the filtrate is evaporated in a vacuum. By recrystallization of the residue from aqueous alcohol, "anhydro-cafesterol," melting point 128–129° C., is obtained in more than 80 per cent yield.

Example 5

1 part of 3:11-diacetoxy-9-hydroxy-cholanic acid, prepared from $\Delta^{9:11}$-3-hydroxy-cholenic acid by hydroxylation of the double bond with osmium tetroxide and subsequent acetylation, are dissolved in 50 parts of pyridine and are boiled for several hours with 25 parts of zinc dust. The reaction mixture is then filtered with suction, the residue on the filter washed with acetone and the filtrate is poured into water, after which it is acidified with sulfuric acid and extracted with ether. The ether solution is washed with dilute sulfuric acid and water, dried and evaporated. Recrystallization of the residue from acetone yields 3-acetoxy-11-keto-cholanic acid in colorless needles.

Other steroid derivatives with a keto group in the 11-position, for example the $\Delta^4$-3:11-diketo-cholenic acid or etiocholenic acid, may be prepared analogously from corresponding 9:11-unsaturated compounds. Since the 9:11-unsaturated compounds are easily obtained from 12-keto derivatives, the new process offers a convenient method for the conversion of 12-keto-steroids into 11-keto-steroids.

In an analogous manner, carbonyl compounds derived from other polynuclear ring systems, for instance those of the nor- and homo-steroid series, may be obtained.

What we claim is:

1. Process for the manufacture of polynuclear carbonyl compounds and their enol esters, comprising heating a member of the group consisting of glycols of the cyclopentanopolyhydrophenanthrene series and their esters with a metal selected from the group consisting of copper, zinc and cadmium in a finely divided state in the presence of inert diluents.

2. Process for the manufacture of polynuclear carbonyl compounds, comprising heating esters of glycols of the cyclopentanopolyhydrophenanthrene series with a metal selected from the group consisting of copper, zinc and cadmium in a finely divided state in the presence of inert diluents, and then treating with hydrolyzing agents.

3. Process for the manufacture of polynuclear carbonyl compounds and their enol esters, comprising heating esters of saturated and unsaturated pregnane-17:20:21-triols with zinc in a finely divided state in the presence of inert diluents.

4. Process for the manufacture of polynuclear carbonyl compounds and their enol esters, comprising heating esters of $\Delta^4$-pregnene-3-one-17:20:21-triols with zinc in a finely divided state in the presence of inert diluents.

5. Process for the manufacture of polynuclear carbonyl compounds, comprising heating esters of saturated and unsaturated pregnane-17:20:21-triols with zinc in a finely divided state in the presence of inert diluents, and then treating with hydrolyzing agents.

6. Process for the manufacture of polynuclear carbonyl compounds, comprising heating esters of $\Delta^4$-pregnene-3-one-17:20:21-triols with a metal selected from the group consisting of copper, zinc and cadmium in a finely divided state in the presence of inert diluents, and then treating with hydrolyzing agents.

KARL MIESCHER.
JULES HEER.